United States Patent Office 3,228,638
Patented Jan. 11, 1966

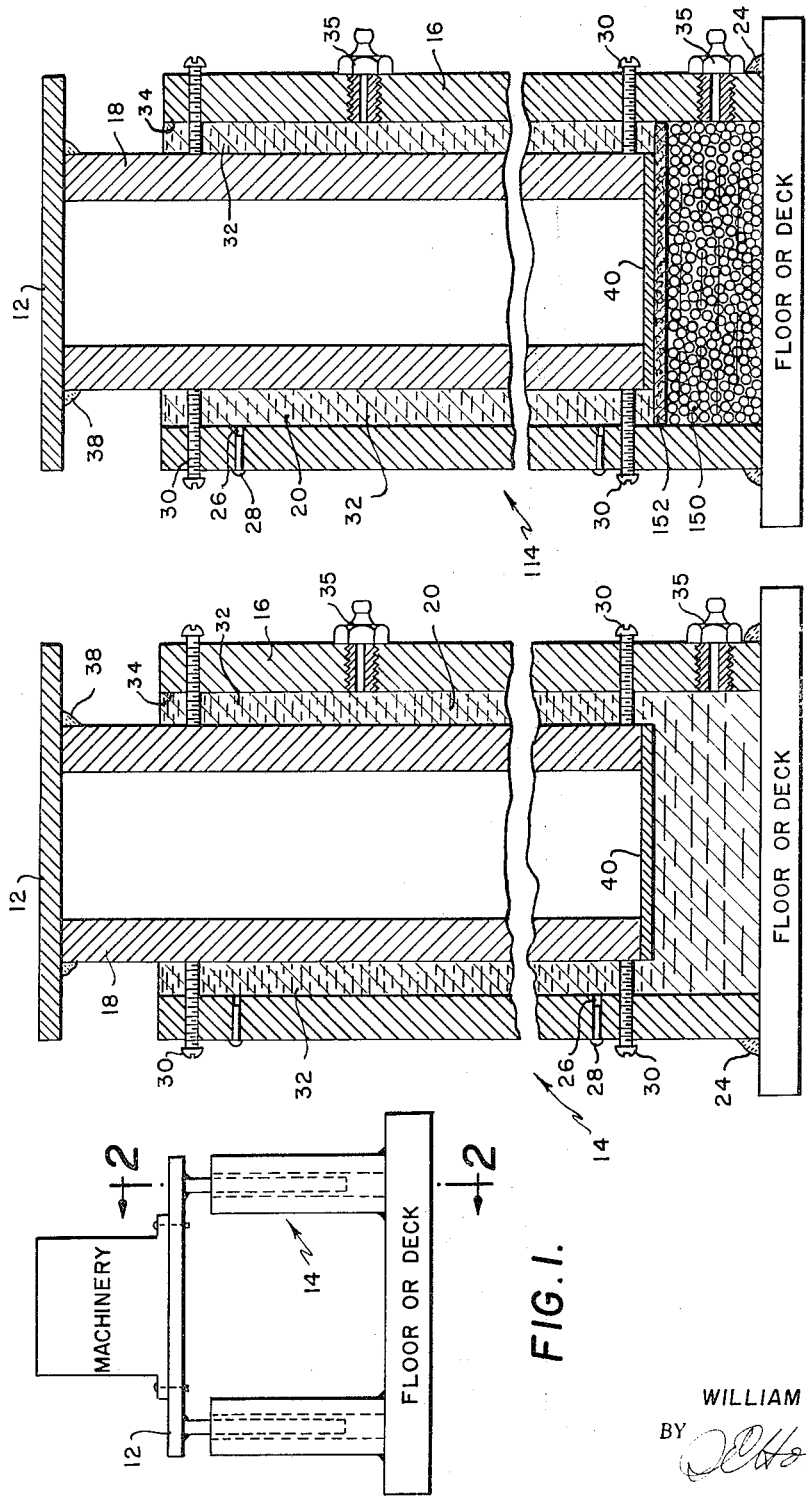

3,228,638
MACHINERY FOUNDATION AND METHOD
OF ASSEMBLING
William J. Burch, Annapolis, Md., assignor to the United States of America as represented by the Secretary of the Navy
Filed Dec. 5, 1963, Ser. No. 328,437
3 Claims. (Cl. 248—22)
(Granted under Title 35, U.S. Code (1952), sec. 266)

The invention described herein may be manufactured and used by or for the Government of the United States of America for governmental purposes without the payment of any royalties thereon and therefor.

The present invention relates to machinery supports and more particularly, to vibration and shock, damping and isolating supports. While the machinery support of the present invention will be described as employed aboard a ship or submarine, it should be understood that it could be effectively employed wherever it is desired to dampen machine vibrations and isolate them from their surrounding environment.

It is desirable to keep vibrations to a minimum on ships and submarines because they are noisy and unpleasant to the ship board personnel and also, they are easily transmitted through water and can be picked up and used by others to determine the position of the ship. The latter phenomenon is particularly dangerous in warfare where the enemy vessels are equipped to detect these vibrations and quickly determine the ship's position.

Machinery aboard vessels often produce such undesirable vibrations and noises, and the transmission of these structure-borne vibrations to the ship's hull must be substantially reduced or eliminated. Similarly, it is desirable to protect the machinery from the shock forces received by the ship's hull when the ship is torpedoed, mined, subjected to depth charges or driven through rough waters.

In existing machine foundation assemblies, one type of structure is used to isolate the machine vibrations, and a separate structure is employed to dampen machine vibrations. For example, resilient isolation mounts are placed between the machine and its support, and damping materials are applied externally to the support components. The use of separate structures has not proved entirely satisfactory for several reasons. One reason is that they are expensive. Also, they take up additional space, and in certain environments, e.g., on submarines, space is limited. Consequently, due to lack of space, one of these structures must be eliminated, and the remaining structure is not entirely effective alone. Moreover, the application of damping materials to machine supports often requires that either the support structure and/or the damping treatment be modified, sacrificing some of their effectiveness.

The general purpose of the present invention, therefore, is to provide a machinery support which will dampen and isolate machinery vibrations while protecting the machinery from shock forces emanating from the foundation upon which the support stands via a single structure and to provide an optimum method of assembling the support. In accordance with the present invention, this is accomplished, generally, by placing a body of damping and isolating material between the machine and the foundation.

An object of this invention is to provide an improved machine support which is easier and less expensive to manufacture.

Another object of this invention is to provide a machinery support which will, through the use of one and the same structure (1) isolate the machine vibrations, (2) dampen the machine vibrations, and (3) protect the machine from shock pulses from the foundation upon which the support stands.

Still another object of the present invention is to provide a machine support which will occupy less space than existing machine foundations which perform the same functions.

A further object of the present invention is to provide an improved method of assembling a machine support which dampens and isolates machinery vibrations.

A still further object of the present invention is to provide a machine support structure which may have its component parts manufactured in a shop and may be quickly, easily, and effectively assembled at the location where the support will be employed.

Other objects and advantages of the invention will hereinafter become more fully apparent from the following description when read in conjunction with the annexed drawings, in which:

FIGURE 1 is a view of an overall embodiment of this invention illustrating its application as a machinery support;

FIGURE 2 is a detailed sectional view of one of the supports of FIGURE 1 taken along the line 2—2 of FIGURE 1; and FIGURE 3 is a sectional view of an alternative embodiment of one of the supports of FIGURE 1.

Referring now to the drawings, wherein like reference characters designate like or corresponding parts throughout the several views, there is shown in FIGURE 1 a piece of machinery mounted on a foundation top 12 which is in turn mounted upon supports 14 of the present invention. As seen in FIGURE 2, support 14 includes an outer column component or base member 16 shown as a tubular shell, an inner column component 18 shown as a support member having a depending projection, and a vibration damping substance 20 interposed between the outer and inner column components to prevent metal-to-metal contact therebetween.

Outer column component 16 is secured at it lower end to a floor or ship deck, as by welding 24. There are vents 26 through the wall of the outer column component for a purpose described hereinafter and plugs 28 closing the vents. Positioning screws 30 also extend through the outer column component wall for centering the inner column component within the cavity 32 in the outer column component but spaced from the peripheral wall 34 of the cavity. Although outer column component 16 is shown as having its bottom end open, cavity 32 could terminate short of the bottom end of the outer column component leaving the bottom end closed. Grease fittings 35 also extend through the outer column component for providing a passage for introducing the damping substance 20 into cavity 32, as will be more fully described hereinafter.

Inner column component or support member 18 has foundation top 12 welded at 38 to its top end for supporting machinery thereon. The inner column component is hollow which renders it light and is closed at its bottom end by a cap plate 40 to prevent the vibration damping substance 20 from filling the hollow area. If greater damping is desired, the cap plate may be eliminated and damping substance 20 permitted to fill the hollow area.

The vibration damping material 20 is composed of a two-part, self-setting, room temperature curing, visco-elastic compound, such as Miracle Adhesives Corporation Type CA–40 Flexible Epoxy-Lead Filled Resin which has a durometer hardness between 60 and 80 at 75° F. The compound may be introduced in a liquid state into cavity 32 through the use of a grease gun and grease fittings 35 and should then be allowed to set or polymerize whence it will bond or adhere to the metallic surfaces which it separates.

The visco-elastic damping material, after it has set, will support inner column component 18 in cavity 32 and will dampen any vibrations imparted to the inner column component by the machinery. Also, its bond strength will enable it and support 14 to resist the extreme inertial forces associated with exposure to high impact shock conditions. Proper selection of the visco-elastic material will depend on the temperature characteristics of the use environment. For maximum effectiveness, both as an isolating and damping material, it should not be temperature responsive to the extent that it could be classified as a thermoplastic; i.e. it should not repeatedly harden and soften when exposed to low (32° F.) and high (100° F.) temperatures. Material which is non-thermoplastic in this realtively restricted temperature range will ensure maximum effectiveness without dependence on environment temperature. In the event that environment temperatures are to be essentially or almost constant, a material that exhibits maximum effectiveness at that temperature may be profitably employed.

In assembling support 14, the welding of the outer column component to the floor or deck, and the welding of the foundation top to the inner column component should be done out of the vicinity of the damping materials since the high temperatures generated by the welding operations might cause degradation of the effectiveness of the constrained damping material due to physical and/or chemical property changes. Support 14 is assembled in the following manner: Outer column component 16 is welded to the floor or deck at its lower end, and foundation top 12 is welded or otherwise secured to the upper end of inner column component 18. Now the inner column component is inserted into cavity 32 and held suspended therein. The positioning screws 30 are now tightened to hold the inner column component in cavity 32. Next the damping material 20 in liquid form is injected into the cavity 32 through one of the grease fittings 35 by a grease gun. As damping material 20 fills the lower end of cavity 32 and moves up to fill the annular space between inner and outer column components, it will flow out of the vents 26. This will assure the personnel who are assembling the support that there are no substantial air pockets in the cavity 32. When the damping material begins to flow out of each vent, a plug 28 is inserted in the vent to close it and stop the leakage. After the damping material fills the lower portion of cavity 32, one or more additional grease fittings may be employed to fill the upper portions. The filling of cavity 32 from the bottom up will help insure against air pockets in the cavity. When the level of the damping material reaches the top of outer column component 16, the filling operation is ceased, and the damping material is allowed to set or polymerize. As hereinabove set forth, as the liquid polymerizes it will bond to the surfaces of the inner and outer column components.

After the damping material 20 polymerizes, it will be able to support the inner column component in cavity 32. Now, positioning screws 30 may be removed since the polymerized damping material will maintain and support the inner column component in the center of cavity 32. Plugs may be inserted into the wall of the outer column component to fill the spaces left by the positioning screws 30. The very small spaces in the damping material left by the removal of the positioning screws are normally of no consequence. If desired, however, they may be filled with an elastic putty. As can be seen, a support is now assembled wherein there is no metal-to-metal contact between the machinery foundation top and the deck of the ship. Damping material 20 serves the dual function of damping the inner column component and isolating the inner and outer column components, one from the other.

The support 114 shown in FIG. 3 is similar to the support 14 of FIGURE 2 and may be used in place thereof. The inner and outer column components 16 and 18 and damping material 20 are identical to inner and outer column components and damping material of support 14.

The bottom of the cavity 32, however, is filled with a plurality of air filled, flexible hollow spheres 150. A porous sheet of material, such as a porous sintered metal fiber sheet 152 is placed on top of the spheres 150 for a purpose described below, and the spaces between spheres 150 are filled by damping material 20. The inclusion of the air filled, flexible hollow spheres, which should be rubber or elastomeric plastic, provides more effective isolation and a dissipative barrier between the high impact shock forces from the ship's deck and the machinery supported.

To assemble support 114, outer column component 16 is welded to the deck and foundation top 12 is welded or otherwise secured to the top of inner column component 18. Then the spheres are poured into the bottom of cavity 32 and porous sheet 152 is laid on top of the spheres. Now, the inner column component is lowered into the cavity 32 until it is brought to rest on the porous sheet 152 and the plurality of hollow spheres 150. Next the positioning screws 30 are adjusted to center the inner column component within cavity 32. Damping material 20 is now injected in liquid form into cavity 32 via lower-most grease fitting 35, and being so injected, will flow into and fill the spaces between the spheres 150, and will flow through the porous sheet to fill the annular space between the inner and outer column component. Vents 26 and additional grease fittings may be employed in the same manner and for the same purpose described in the assembling process of support 14 above. The damping material is now allowed to polymerize, after which it will be able to support inner column component 18 within cavity 32, and positioning screws 30 are removed. The air filled, flexible hollow spheres add to the effectiveness of the isolation of the machine vibrations.

The porous sheet of material 152 is used as a barrier to prevent the hollow spheres from floating up between the inner column component and the peripheral wall of cavity 32 when the damping material is injected into cavity 32 in liquid form.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. A support for machinery or the like for damping and isolating vibrations from the machinery and for protecting the machinery from shock forces emanating from a foundation on which the machinery is mounted, said support comprising:

an outer column component mounted on said foundation and having a vertically extending and upwardly opening cavity therein;

said outer column component having an air vent in the wall thereof communicating with said vertically extending and upwardly opening cavity therein;

a hollow inner column component received within said cavity in said outer column component and spaced within said cavity a pre-selected distance from the peripheral wall of said cavity;

one end of said inner column component being positioned within said cavity and the opposite end thereof terminating outside of said cavity;

sealing means carried on the end of said inner column component positioned within said cavity for sealing one end of said inner column component;

the outer peripheral surface of said inner column component and said peripheral wall of said cavity defining a space within said cavity;

means carried on the opposite end of said inner column component for supporting said machinery; and a cured, visco-elastic material occupying the space defined by the outer peripheral surface of said inner column component and the peripheral wall of said cavity in said outer column component for holding said inner and outer column components in assembly and at a pre-selected distance apart;

said visco-elastic material being bonded to the peripheral surfaces of said inner column component and said cavity and being operable to both damp and isolate the vibrations produced by the supported machinery and also functioning to isolate the machinery from impact shock loads emanating from said foundation;

said visco-elastic material being comprised of a two-part, self-setting, room-temperature curing, flexible epoxy-lead resin having a durometer hardness of between 60 and 80 at 75° F.;

said visco-elastic material before curing being introduced in liquid form into said space defined by the outer peripheral surface of said inner column component and the peripheral wall of said cavity in said outer column component;

said air vent in the wall of said outer column component providing a passageway for the escape of air trapped in pockets in said liquid visco-elastic material of substantial air pockets in said visco-elastic material and thereby functioning to prevent the formation of material as it is being introduced in liquid form into said defined space.

2. A support for machinery or the like for damping and isolating vibrations from the machinery and for protecting the machinery from shock forces emanating from a foundation on which the machinery is mounted, said support comprising:

an outer column component mounted on said foundation and having a vertically extending and upwardly opening cavity therein;

said outer column component having an air vent in the wall thereof communicating with said cavity therein;

a fitting carried in the wall of said outer column component and communicating with said cavity therein;

a hollow inner column-component received within said cavity in said outer column component and spaced within said cavity a pre-selected distance from the peripheral wall of said cavity;

one end of said inner column component being positioned within said cavity and the opposite end thereof terminating outside of said cavity;

sealing means carried on the end of said inner column component positioned within said cavity for sealing one end of said inner column component;

the outer peripheral surface of said inner column component and said peripheral wall of said cavity defining a space within said cavity;

means carried on the opposite end of said inner column component for supporting said machinery; and a cured, visco-elastic material occupying the space defined by the outer peripheral surface of said inner column component and the peripheral wall of said cavity in said outer column component for holding said inner and outer column components in assembly and at a pre-selected distance apart;

said visco-elastic material being comprised of a two-part, self-setting, room temperature curing, flexible epoxy-lead resin having a durometer hardness when cured of between 60 and 80 at 75° F.;

said visco-elastic material being bonded to the peripheral surfaces of said inner column component and said cavity and being operable to both damp and isolate the vibrations produced by the supported machinery and also functioning to isolate the machinery from impact shock loads emanating from said foundation;

said visco-elastic material before curing being introduced in liquid form through said fitting into said space defined by the outer peripheral surface of said inner column component and the peripheral wall of said cavity in said outer column component;

said air vent in the wall of said outer column component providing a passageway for the escape of air trapped within said liquid visco-elastic material and thereby functioning to prevent the formation of substantial air pockets in said visco-elastic material as it is being introduced in liquid form into said defined space.

3. A support for machinery or the like for damping and isolating vibrations from the machinery and for protecting the machinery from shock forces emanating from a foundation on which the machinery is mounted, said support comprising:

a hollow outer column component mounted on said foundation;

said foundation providing a closure for one end of said hollow outer column component and thereby defining a vertically extending and upwardly opening cavity within said hollow outer column component;

a hollow inner column component received within said cavity in said outer column component and spaced within said cavity a pre-selected distance from the peripheral surface of said cavity;

one end of said inner column component being positioned within said cavity and the opposite end thereof terminating outside of said cavity;

sealing means carried on said one end of said inner column component positioned within said cavity for sealing said one end of said inner column component;

the outer peripheral surface of said inner column component and said peripheral surface of said cavity defining a space within said cavity;

a sheet material element carried within said cavity and abutting said sealing means on said one end of said inner column component;

a plurality of air-filled spherical elements carried within said cavity and positioned therein between said sheet material element and the foundation on which said hollow outer column component is mounted;

said sheet material element being formed of porous damping material and acting as a barrier to confine said air-filled spherical elements between said sheet material element and said foundation;

means carried on the opposite end of said inner column component for supporting said machinery; and a cured, visco-elastic material occupying the space in said cavity defined by the outer peripheral surface of said inner column component and the inner peripheral surface of said outer column component and occupying the space within said cavity between said sheet material element and said foundation not occupied by said plurality of air-filled spherical elements;

said cured, visco-elastic material holding said inner and outer column components in assembly and at a pre-selected distance apart;

said visco-elastic material being bonded to the peripheral surfaces of said inner and outer column components and to the peripheral surfaces of said plurality of air-filled spherical elements and said sheet material element and, in function, being operable to both damp and isolate the vibrations produced by the supported machinery as well as being operable to isolate the machinery from impact shock loads emanating from said foundation;

said spherical elements and said sheet material element serving to further isolate said machinery from impact shock loads emanating from said foundation.

References Cited by the Examiner

UNITED STATES PATENTS

| | | | |
|---|---|---|---|
| 1,731,412 | 10/1929 | Froesch | 248—10 X |
| 2,153,388 | 4/1939 | Newman | 29—150 |
| 2,438,884 | 3/1948 | Kropp | 29—150 |
| 2,658,710 | 11/1953 | Titus | 248—20 X |
| 2,689,629 | 9/1954 | Kendall et al. | 267—1 X |
| 3,018,991 | 1/1962 | Slayter | 248—22 |
| 3,030,099 | 4/1962 | Piatscheck | 248—358 X |
| 3,078,969 | 2/1963 | Campbell et al. | 248—358 X |
| 3,128,978 | 6/1964 | Sykes | 248—22 |
| 3,152,798 | 10/1964 | Jarret et al. | 267—1 |

CLAUDE A. LE ROY, *Primary Examiner*.

J. PETO, *Assistant Examiner*.